(12) United States Patent
Danze

(10) Patent No.: US 11,724,648 B2
(45) Date of Patent: Aug. 15, 2023

(54) MODULAR VEHICLE MIRROR ASSEMBLY

(71) Applicant: Marcelo Danze, Aliso Viejo, CA (US)

(72) Inventor: Marcelo Danze, Aliso Viejo, CA (US)

(73) Assignee: Super ATV LLC, Madison, IN (US)

( * ) Notice: Subject to any disclaimer, the term of this patent is extended or adjusted under 35 U.S.C. 154(b) by 0 days.

(21) Appl. No.: 16/948,530

(22) Filed: Sep. 23, 2020

(65) Prior Publication Data

US 2021/0086696 A1 Mar. 25, 2021

Related U.S. Application Data

(60) Provisional application No. 62/904,404, filed on Sep. 23, 2019.

(51) Int. Cl.

| | |
|---|---|
| *B60R 1/12* | (2006.01) |
| *B60R 1/08* | (2006.01) |
| *B60Q 1/00* | (2006.01) |
| *B60Q 1/20* | (2006.01) |
| *B60R 11/04* | (2006.01) |
| *B62J 29/00* | (2006.01) |

(Continued)

(52) U.S. Cl.
CPC .......... *B60R 1/1207* (2013.01); *B60Q 1/0035* (2013.01); *B60Q 1/20* (2013.01); *B60R 1/08* (2013.01); *B60R 11/04* (2013.01); *B60Q 1/0441* (2013.01); *B60Q 1/263* (2013.01); *B60Q 1/2623* (2013.01); *B60Q 1/2626* (2013.01); *B60Q 1/2634* (2013.01); *B60Q 1/2665* (2013.01); *B60R 1/06* (2013.01); *B60R 1/12* (2013.01); *B60R 2001/1253* (2013.01); *B62J 29/00* (2013.01); *F21V 21/088* (2013.01); *F21V 21/0885* (2013.01)

(58) Field of Classification Search
CPC ....... B60Q 1/2665; B60R 1/1207; B62J 29/00
See application file for complete search history.

(56) References Cited

U.S. PATENT DOCUMENTS

| 4,826,306 | A | * | 5/1989 | Grissen | .................. | G02B 7/182 |
| | | | | | | 359/842 |
| 4,974,129 | A | * | 11/1990 | Grieb | ..................... | B60Q 3/258 |
| | | | | | | 362/183 |

(Continued)

FOREIGN PATENT DOCUMENTS

| DE | 102006048323 | A1 | * | 4/2008 | .......... | B60Q 1/2665 |
| EP | 2159103 | A2 | * | 3/2010 | .......... | B60Q 1/2665 |

(Continued)

*Primary Examiner* — Colin J Cattanach
(74) *Attorney, Agent, or Firm* — Woodard, Emhardt, Henry, Reeves & Wagner, LLP

(57) ABSTRACT

A modular vehicle mirror assembly includes a mirror module and an accessory module. The mirror module includes a mirror mounting plate having attachment points to allow a mirror to be removably mounted to the mirror module in a rearward-facing position. The accessory module includes an accessory mounting plate having accessory attachment points to allow an accessory to be removably mounted to the accessory module in a forward-facing position. The mirror module and the accessory module are releasably held together. The assembly allows the user to temporarily, releasably, and interchangeably mount a selected member of a group of accessories, such as headlights, fog lights, driving lights, pencil beam headlights, and cameras.

17 Claims, 5 Drawing Sheets

(51) Int. Cl.
*B60Q 1/26* (2006.01)
*F21V 21/088* (2006.01)
*B60R 1/06* (2006.01)
*B60Q 1/04* (2006.01)

(56) References Cited

U.S. PATENT DOCUMENTS

| | | | | |
|---|---|---|---|---|
| 11,047,411 B2* | 6/2021 | Hodges | ................ | F21S 43/195 |
| 2003/0193613 A1* | 10/2003 | Matko | ................ | B60R 1/00 |
| | | | | 348/335 |
| 2004/0190303 A1* | 9/2004 | Mishimagi | ............ | B60Q 1/2665 |
| | | | | 362/494 |
| 2005/0254153 A1* | 11/2005 | Kawanishi | ............ | B60Q 1/2665 |
| | | | | 359/879 |
| 2005/0254251 A1* | 11/2005 | Chou | ................ | B60Q 1/2665 |
| | | | | 362/494 |
| 2006/0013010 A1* | 1/2006 | Hwan | ................ | B60Q 1/2684 |
| | | | | 362/487 |
| 2007/0103921 A1* | 5/2007 | Kawanishi | ............ | B60Q 1/2665 |
| | | | | 362/494 |
| 2011/0051444 A1* | 3/2011 | Murata | ................ | B60R 1/1207 |
| | | | | 362/494 |
| 2011/0051450 A1* | 3/2011 | Murata | ................ | B60R 1/1207 |
| | | | | 362/540 |
| 2011/0115614 A1* | 5/2011 | Huang | ................ | B62J 6/16 |
| | | | | 340/432 |
| 2011/0170307 A1* | 7/2011 | Ishikawa | ................ | F21S 43/14 |
| | | | | 362/516 |
| 2011/0205649 A1* | 8/2011 | Suzuki | ................ | B60R 1/06 |
| | | | | 359/871 |
| 2012/0294027 A1* | 11/2012 | Merriman | ............ | B60Q 1/2665 |
| | | | | 362/519 |
| 2013/0242586 A1* | 9/2013 | Huizen | ................ | B60Q 1/2665 |
| | | | | 362/494 |
| 2015/0232020 A1* | 8/2015 | Hellin Navarro | ..... | B60R 1/1207 |
| | | | | 362/516 |
| 2016/0236742 A1* | 8/2016 | Chen | ................ | B60Q 1/2696 |
| 2017/0267179 A1* | 9/2017 | Herrmann | ............ | B60Q 1/2665 |
| 2017/0334343 A1* | 11/2017 | Kastanis | ................ | B60Q 1/2665 |
| 2018/0186292 A1* | 7/2018 | Hamlin | ................ | G02F 1/153 |
| 2020/0248734 A1* | 8/2020 | Hodges | ................ | F21S 43/14 |
| 2021/0031694 A1* | 2/2021 | Bhaskar | ................ | B60R 1/02 |

FOREIGN PATENT DOCUMENTS

| | | | | |
|---|---|---|---|---|
| EP | 2457773 A1 * | 5/2012 | ............ | B60R 1/1207 |
| EP | 2949554 A1 * | 12/2015 | ............ | B62J 17/02 |
| WO | WO-2018178268 A2 * | 10/2018 | ............ | B60Q 1/24 |

* cited by examiner

US 11,724,648 B2

MODULAR VEHICLE MIRROR ASSEMBLY

FIELD OF THE INVENTION

This invention relates to the option of adding a forward facing light or other accessory to the exterior mirror of any vehicle requiring exterior mirrors or any vehicle that can accept or be modified to accept exterior mirrors.

BACKGROUND OF THE INVENTION

Vehicles are known as are the components that make up these vehicles including the original equipment manufacturer (OEM) exterior mirrors as well as aftermarket or $3^{rd}$ party supplied exterior mirrors and accessories. The present disclosure relates to vehicles. The present disclosure relates to vehicle exterior mirrors comprising accessory lights either in modular or complete assembly form.

The incorporation of an accessory light with a vehicle exterior mirror was conceived due to the "Inventor's" existing vehicle exterior mirror design Pat. D808,315 that is unique due to the (3) piece modular design. This exemplary design allowed for the unique addition of a forward facing accessory light to be mounted to existing mirrors without having to purchase a complete new exterior mirror and accessory light assembly.

SUMMARY OF THE INVENTION

The modular vehicle exterior mirror design incorporates multiple accessory attachment points for mounting a forward facing accessory light such as a headlight, driving light and/or flood light, or any other type of accessory such as a camera.

While vehicle exterior mirrors and accessory lights are not new or unique, the design of the modular exterior vehicle mirror allowing for the mounting of a forward facing accessory light or any other type of accessory is unique and exemplary.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present design disclosure was originally directed to side-by-side (SXS) or utility vehicle's (UTV), the features disclosed herein may have application to other types of land, air or water based vehicles. Additional subcategory vehicles may include all-terrain vehicles (ATV's), off-road race cars, motorcycles, watercraft, ultralights, snowmobiles, and golf carts to name a few.

Figure 1A:
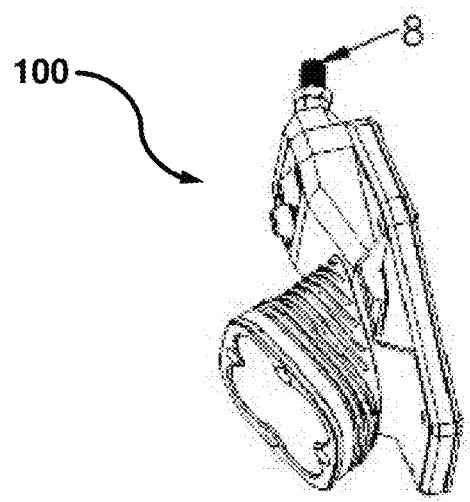
FIG. 1: is a schematic drawing of a modular vehicle exterior mirror assembly that incorporates multiple attachment points from Design Pat. D808,315.

FIG. 1 is an illustrative embodiment of the modular vehicle exterior mirror assembly 100. This embodiment represents the interaction between the (2) primary components: mirror mounting plate 104 and modular mounting plate 105. And the secondary components: fasteners 101, mirror retaining bezel 102, and mirror glass 103. And the accessory components: accessory mounting bracket 106 and light assembly 107.

Referring to FIG. 1, the mirror mounting plate 104 and modular mounting plate 105 contain integrated attachment points 116 for securing accessories through the use of fasteners 101.

Referring to FIG. 1, the mirror mounting plate 104 (see FIG. 3) allows for the attachment of the mirror glass 103 and the mirror retaining bezel 102 on the rear side, And the modular mounting plate 105 and accessory mounting bracket 106 on the front side through the use of fasteners 101. In the illustrated embodiment, accessory mounting bracket 106 is sandwiched between mirror mounting plate 104 and modular mounting plate 105.

Referring to FIG. 1, the modular mounting plate 105 (see FIG. 4) allows for the attachment of the mirror mounting plate 104 on the rear side and additional accessories and or lights on the front side through the use of multiple attachment points.

Referring to FIG. 1, the attachment point fasteners may include threaded studs, threaded adapters, clearance holes and bolts or screws that thread into the mirror mounting plate 104 (see FIG. 3) and modular mounting plate 105 (see FIG. 4) or any other type of fastening device that allows the mirror retaining bezel 102, mirror glass 103, and accessory mounting bracket 106 to connect to the mirror mounting plate 104 and modular mounting plate 105.

Figure 1B:
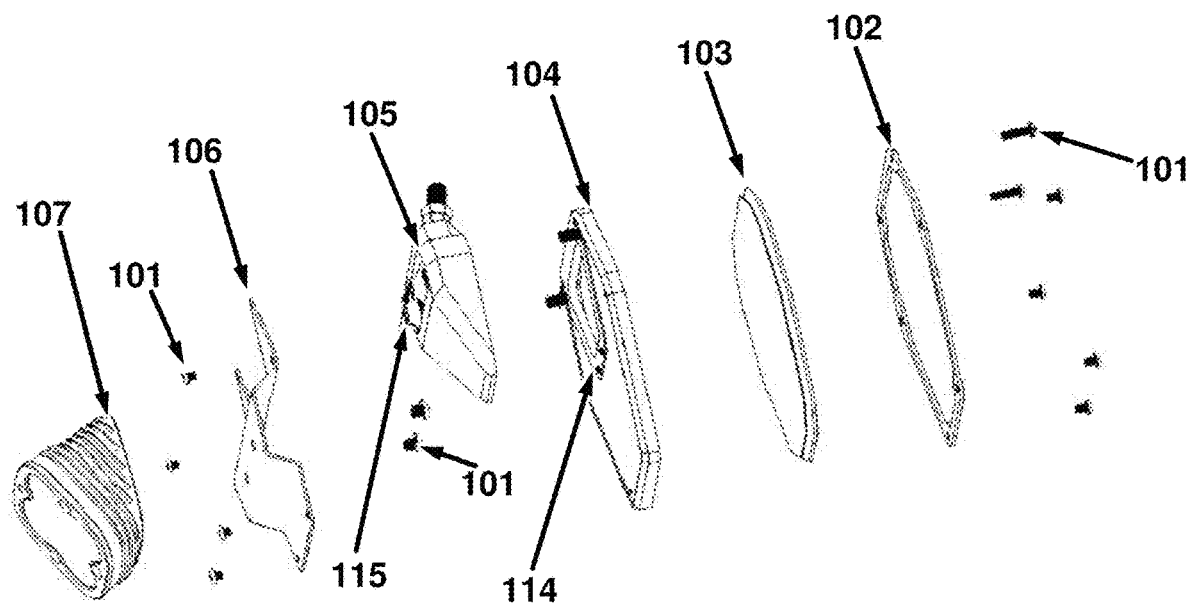
Figure 2A:
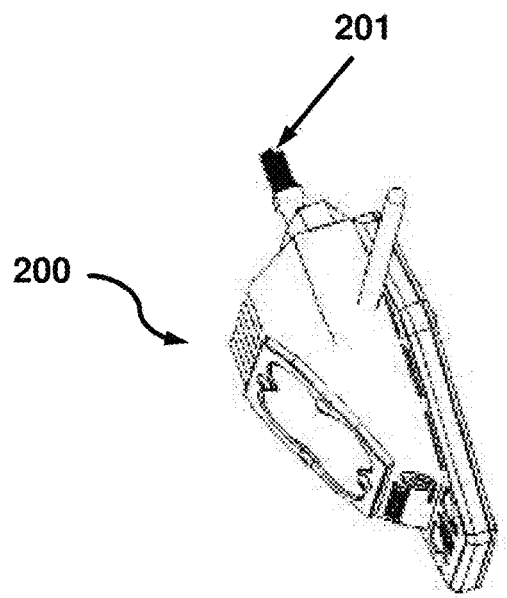
FIG. 2: is a schematic drawing of the mirror in FIG. 1 with the integrated modular headlight.
Figure 2B:
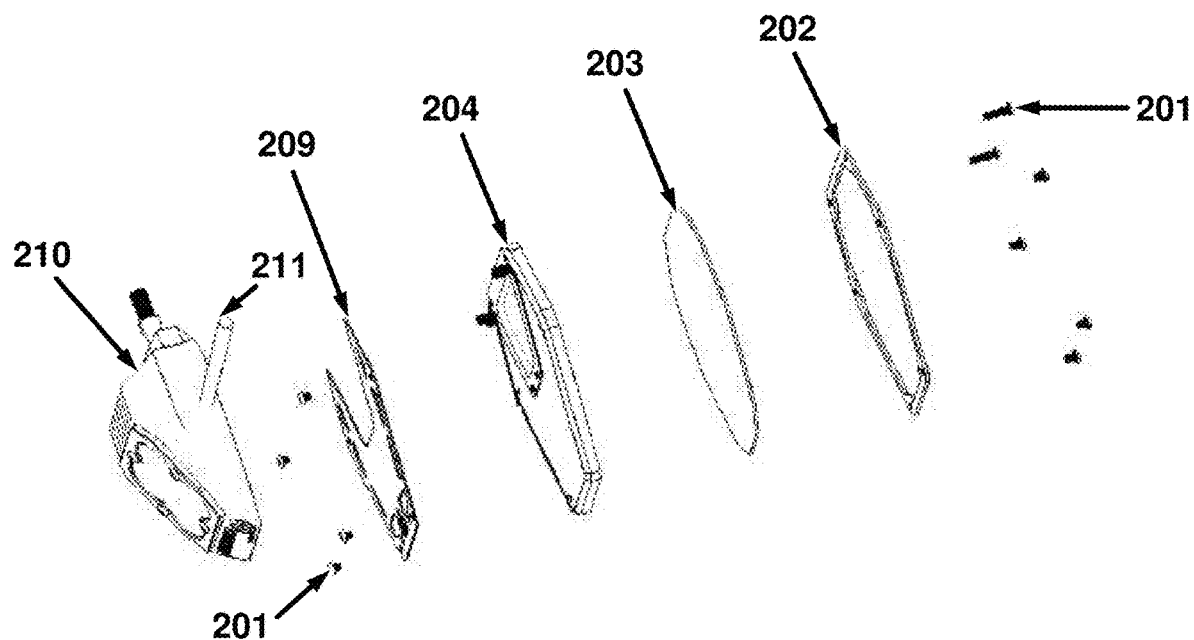

FIG. 2 is an illustrative embodiment of the complete vehicle exterior mirror assembly 200 that incorporates integrated accessory light 210 (see FIG. 5) that integrates a mounting plate with an accessory light. Mirror assembly 200 includes fasteners 201, mirror retaining bezel 202, mirror glass 203, mirror mounting plate 204 with integrated attachment points 214, decorative bezel 209, integrated accessory light 210 and electrical wire 211 to power the accessory. The only difference between FIG. 1 and FIG. 2 is the integrated accessory light 210, the corresponding electrical wiring 211 for accessory light 210 and the decorative bezel 209. Mirror glass 103 and mirror mounting plate 104 can be the same as what is shown in FIG. 1B.

Referring to FIG. 2, the accessory light is shown as a single unit integrated into the module mounting plate 105 (FIG. 1).

Referring to FIG. 2, the electrical wiring 211 for integrated accessory light 210 consists of wiring to connect to a power source within the vehicle.

FIG. 3 is an illustrative embodiment of the mirror mounting plate 104 found in both FIG. 1 and FIG. 2.

Figure 3A:
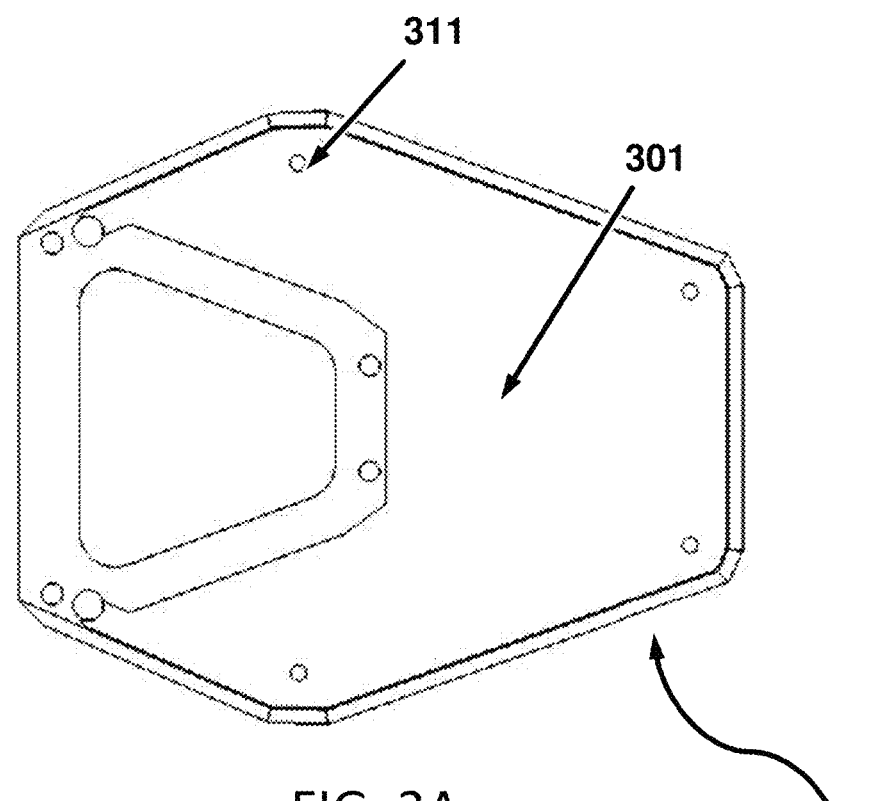
FIG. 3: is a plan view of the front and rear of the mirror mounting plate 4 in FIG. 1 and FIG. 2.
Figure 3B:
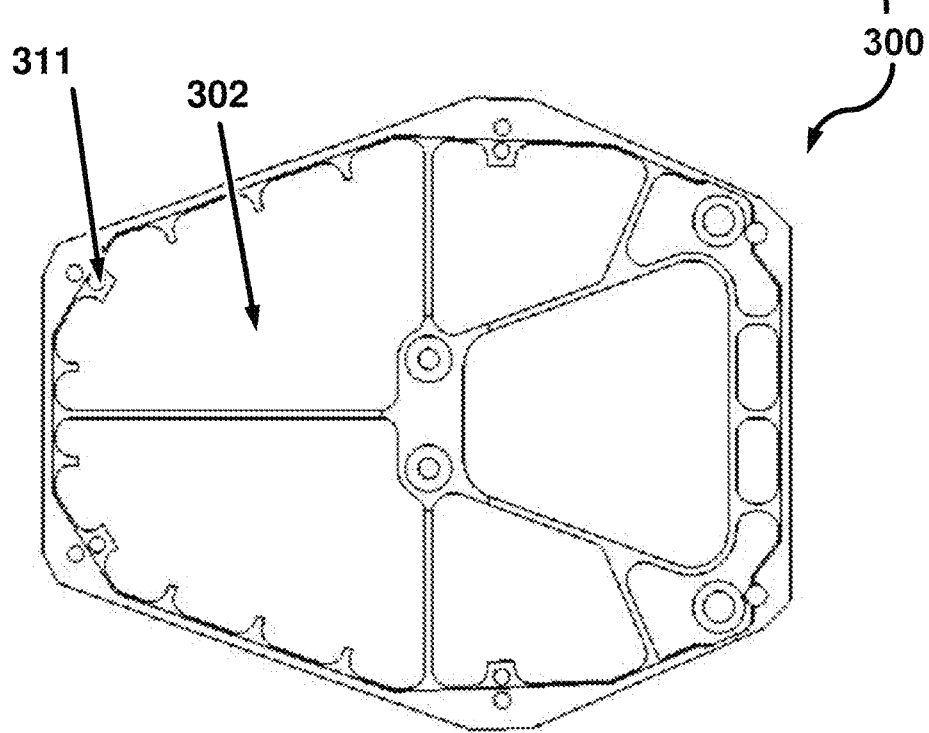

Referring to FIGS. 3A and 3B, mirror mounting plate 300 is illustrated with front side 301, rear side 302, and attachment points 311.

Referring to FIG. 3B, the rear view shows rear side 302 with numerous attachment points 311 for the mirror retaining bezel 102 or 202 from FIG. 1 and FIG. 2.

Figure 4A:
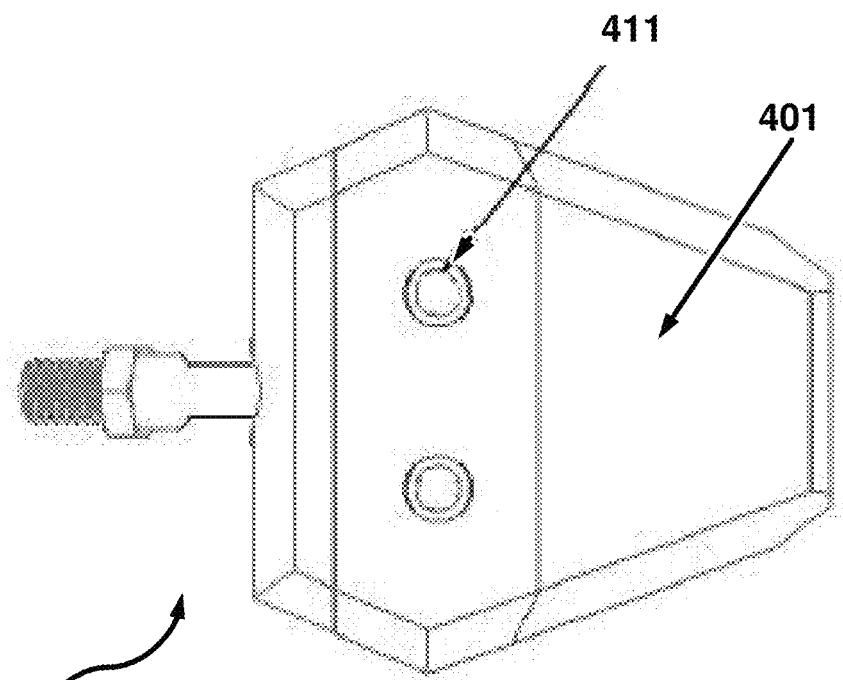
FIG. 4: is a plan view of the front and rear of the modular mounting plate 5 in FIG. 1.
Figure 4B:
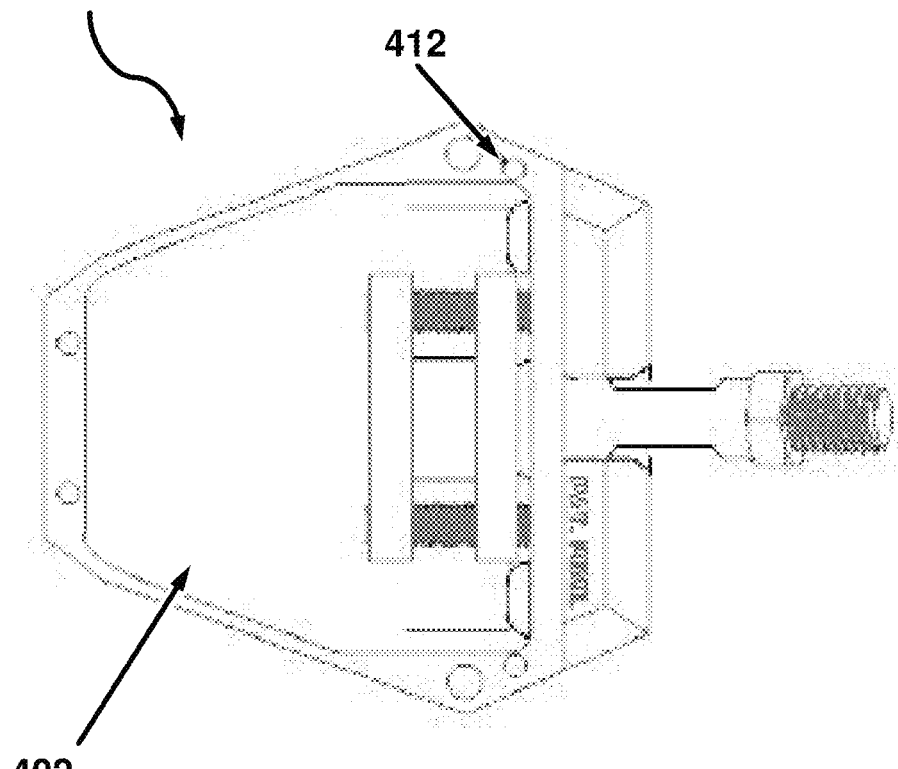

FIG. 4 is an illustrative embodiment of the modular mounting plate 105 found in FIG. 1 FIGS. 4A and 4B show modular mounting plate 400, with front side 401, rear side 402, front attachment points 411, and rear attachment points 412.

Referring to FIG. 4A, the front view shows front side 401 having (2) circular attachment points 411 for mounting accessories such as a light, camera or any other accessory.

Referring to FIG. 4B, the rear view shows rear side 402 having multiple attachment points 412 for connecting the modular mounting plate 105 in FIG. 1 to the mirror mounting plate 104 or 204 in both FIG. 1 and FIG. 2.

Figure 5A:
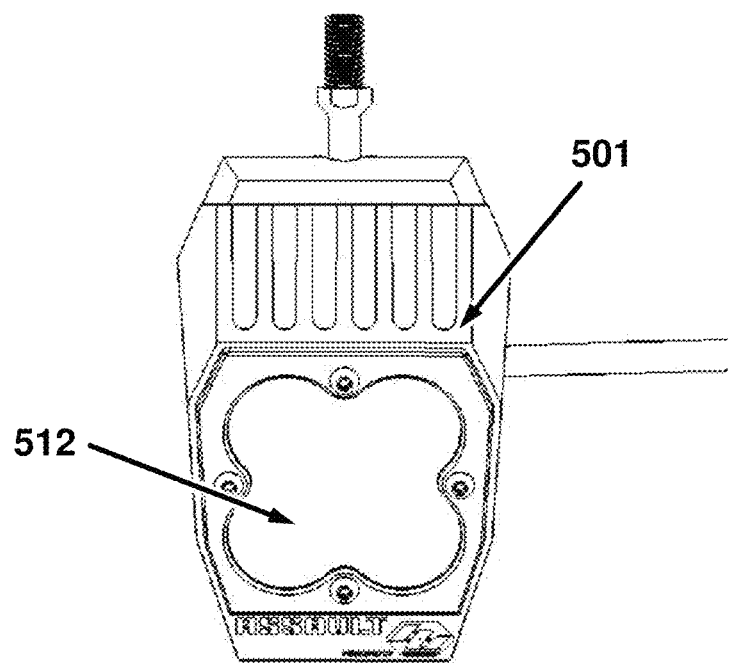
FIG. 5: is a plan view of the front and rear of the modular mounting plate with integrated accessory light 6 in FIG. 2.
Figure 5B:
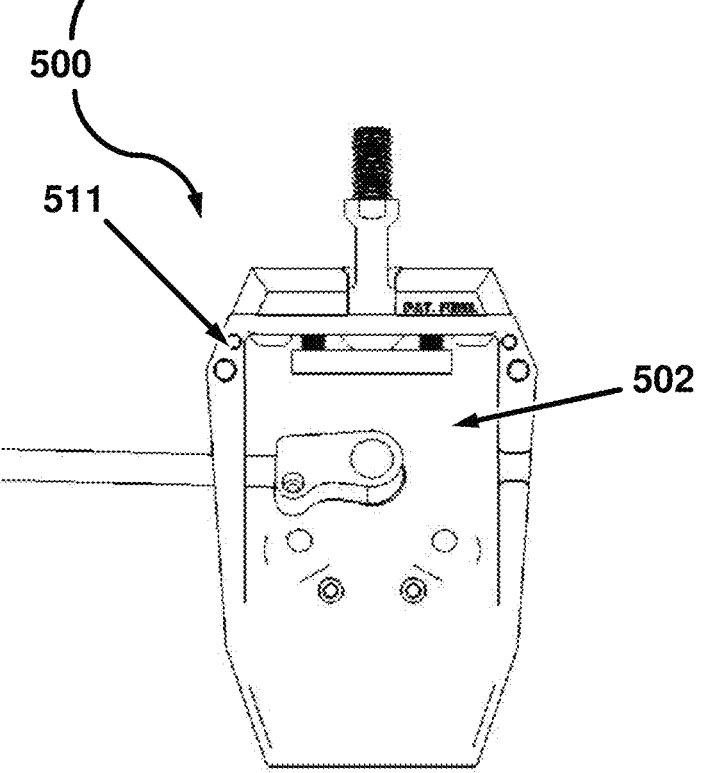

FIG. 5 is an illustrative embodiment of the integrated accessory light 210 found in FIG. 2. FIGS. 5A and 5B show modular mounting plate 500, with front side 501, rear side 502, attachment points 511, and integrated accessory light 512.

Referring to FIG. 5A, the front view shows front side 501 with the integrated forward facing light 512.

Referring to FIG. 5B, the rear view shows rear side 502 with multiple attachment points 511 for connecting integrated accessory light 512 to the mirror mounting plate 204 as shown in FIG. 2.

While this invention has been described as having an exemplary design it may be further enhanced within the spirit and scope of this disclosure. This application is intended to cover any variations, uses, or adaptations of the invention using its general principles. Additionally, this application is intended to cover such modifications from the present disclosure as come within known or customary practice in the art to which this invention exists.

The exemplary embodiments of the invention in which an exclusive property or privilege is claimed are defined as follows:

1. A modular vehicle mirror assembly comprising:
   a) a mirror module comprising:
      i) a mirror mounting plate have a front and a rear, and including mirror attachment points on the rear and effective to allow a mirror to be removably mounted to the mirror module in a rearward-facing position, wherein the mirror mounting plate is planar in shape;
      ii) a mirror removably mounted to the mirror module, wherein the mirror is planar in shape;
   b) a modular adapter configured to mount the modular vehicle mirror assembly outside of a vehicle, wherein the mirror module is removable coupled to the modular adapter, and wherein the mirror mounting plate overhangs the modular adapter when the mirror mounting plate is received on the rear side of the modular adapter; and
   c) an accessory module comprising:
      i) an accessory mounting plate having a front and a rear, and including one or more accessory attachment points on the front and effective to allow one or more accessories to be removably mounted to the accessory module in a forward-facing position, wherein the accessory mounting plate is positioned between the mirror mounting plate and the modular adapter, and wherein the mirror mounting plate overhangs the accessory mounting plate when the mirror mounting plate is received on the rear side of the modular adapter;
   wherein the mirror module and the accessory module are releasably attached together.

2. The modular vehicle mirror assembly of claim 1, further including an accessory removably mounted to the front of the accessory module on the one or more accessory attachment points.

3. The modular vehicle mirror assembly of claim 1, wherein the mirror module further includes a bezel fastened to the mirror mounting plate so that the mirror is secured between the bezel and the mirror mounting plate, thus removably mounting the mirror to the mirror module.

4. The modular vehicle mirror assembly of claim 1, further comprising a light source coupled to the accessory mounting plate.

5. The modular vehicle mirror assembly of claim 4, wherein the light source is selected from the group consisting of headlight, fog light, driving light and pencil beam headlight.

6. A modular vehicle mirror assembly comprising:
   a mirror mounting plate having a front and a rear, and including mirror attachment points on the rear adapted to receive a removably mounted mirror in a rearward-facing position;
   a mirror removably mounted to the mirror mounting plate in the rearward-facing position;
   a modular assembly comprising a mounting adapter configured to mount the modular assembly outside of a vehicle, the modular assembly further comprising a front side, a light source on the front side and a rear side, wherein the modular assembly is adapted to removably receive the mirror mounting plate on the rear side, wherein the mirror mounting plate overhangs the modular assembly when the mirror mounting plate is received on the rear side of the modular assembly; and
   a bezel plate positioned between the mirror mounting plate and the modular assembly, wherein the bezel plate is visible when the mirror mounting plate is received on the rear side of the modular assembly.

7. The modular vehicle mirror assembly of claim 6, wherein the light source is selected from the group consisting of headlight, fog light, driving light and pencil beam headlight.

8. The modular vehicle mirror assembly of claim 7, further comprising a removable mirror retaining bezel adapted to secure the mirror between the removable mirror retaining bezel and the mirror mounting plate.

9. The modular vehicle mirror assembly of claim 8, further comprising a power cord extending from the modular assembly adapted to supply power to the light source.

10. The modular vehicle mirror assembly of claim 6, further comprising a removable mirror retaining bezel adapted to secure the mirror between the removable mirror retaining bezel and the mirror mounting plate.

11. The modular vehicle mirror assembly of claim 6, wherein the mirror mounting plate is planar in shape.

12. The modular vehicle mirror assembly of claim 11, wherein the mirror is planar in shape.

13. A modular vehicle mirror assembly comprising:
   a mirror mounting plate having a front and a rear, and including mirror attachment points on the rear adapted to receive a removably mounted mirror in a rearward-facing position, wherein the mirror mounting plate is planar in shape;
   a mirror removably mounted to the mirror mounting plate in the rearward-facing position, wherein the mirror is planar in shape; and
   a modular assembly comprising a mounting adapter configured to mount the modular assembly outside of a vehicle, the modular assembly further comprising a front side, a light source on the front side and a rear side, wherein the modular assembly is adapted to removably receive the mirror mounting plate on the rear side, wherein the mirror mounting plate overhangs the modular assembly when the mirror mounting plate is received on the rear side of the modular assembly.

14. The modular vehicle mirror assembly of claim 13, wherein the light source is selected from the group consisting of headlight, fog light, driving light and pencil beam headlight.

15. The modular vehicle mirror assembly of claim 14, further comprising a removable mirror retaining bezel adapted to secure the mirror between the removable mirror retaining bezel and the mirror mounting plate.

16. The modular vehicle mirror assembly of claim 15, further comprising a power cord extending from the modular assembly adapted to supply power to the light source.

17. The modular vehicle mirror assembly of claim 13, further comprising a removable mirror retaining bezel adapted to secure the mirror between the removable mirror retaining bezel and the mirror mounting plate.

\* \* \* \* \*